(12) United States Patent
Ohnaka et al.

(10) Patent No.: US 11,400,984 B2
(45) Date of Patent: Aug. 2, 2022

(54) VEHICLE BODY SIDE PART STRUCTURE

(71) Applicant: HONDA MOTOR CO., LTD., Tokyo (JP)

(72) Inventors: Ryo Ohnaka, Wako (JP); Shinobu Sagawa, Wako (JP); Ren Kirinashizawa, Wako (JP); Masaru Sakairi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/115,824

(22) Filed: Dec. 9, 2020

(65) Prior Publication Data

US 2021/0179184 A1 Jun. 17, 2021

(30) Foreign Application Priority Data

Dec. 11, 2019 (JP) .............................. JP2019-223930

(51) Int. Cl.
*B62D 25/02* (2006.01)
*B62D 25/04* (2006.01)
*B62D 21/15* (2006.01)

(52) U.S. Cl.
CPC ......... *B62D 25/025* (2013.01); *B62D 21/152* (2013.01); *B62D 25/04* (2013.01)

(58) Field of Classification Search
CPC .............................. B62D 25/04; B62D 25/025
USPC .................... 296/209, 193.06, 187.09, 187.1
See application file for complete search history.

(56) References Cited

U.S. PATENT DOCUMENTS

| 2017/0313357 A1* | 11/2017 | Narahara | ............. B62D 25/025 |
| 2017/0313359 A1* | 11/2017 | Narahara | ............. B62D 25/025 |

FOREIGN PATENT DOCUMENTS

| CN | 105164005 B | * 10/2017 | ........... B62D 21/152 |
| JP | 2013-169806 | 9/2013 | |
| JP | 2014-046822 | 3/2014 | |
| JP | 2016-060402 | 4/2016 | |
| JP | 6156258 | 7/2017 | |

(Continued)

OTHER PUBLICATIONS

Japanese Office Action for Japanese Patent Application No. 2019-223930 dated Aug. 10, 2021.

*Primary Examiner* — Dennis H Pedder
(74) *Attorney, Agent, or Firm* — Amin, Turocy & Watson, LLP (57) ABSTRACT

In a vehicle body side part structure, a front pillar has a pillar inner panel and a pillar outer panel. A side sill has a sill inner panel and a sill outer panel. A sidewall and a front wall of the pillar outer panel on an inner side in a vehicle width direction extend to a position at which the sidewall and the front wall overlap the side sill in an upward/downward direction. A defective section is provided on a front section of the sill outer panel. A reinforcement plate extending in a vehicle upward/downward direction is coupled to a rear region of an inner side surface of the pillar outer panel. A lower end of the reinforcement plate extends to a position at which the lower end overlaps the defective section in the upward/downward direction on a side behind the defective section. A lower edge portion of the sidewall of the pillar outer panel is joined to a sidewall of the sill outer panel on an outer side in the vehicle width direction.

13 Claims, 7 Drawing Sheets

(56) References Cited

FOREIGN PATENT DOCUMENTS

JP 2017-197057 11/2017
WO WO-2011121919 A1 * 10/2011 ........... B62D 25/025

* cited by examiner

VEHICLE BODY SIDE PART STRUCTURE

CROSS-REFERENCE TO RELATED APPLICATION

Priority is claimed on Japanese Patent Application No. 2019-223930, filed on Dec. 11, 2019, the contents of which are incorporated herein by reference.

BACKGROUND

Field of the Invention

The present invention relates to a vehicle body side part structure including a lower region of a front pillar.

Background

As a vehicle body side part structure including a lower region of a front pillar, a structure in which a part of the front pillar is plastically deformed upon input of an impact load from a side in front of a vehicle and thus absorbs the energy of the impact load is known (for example, see Japanese Patent No. 6156258).

In the vehicle body side part structure disclosed in Japanese Patent No. 6156258, a reinforcement member extending in a vehicle upward/downward direction is joined to a portion in a closed cross section of a lower region of the front pillar adjacent to a front section, and a portion of the closed cross section adjacent to a rear section is provided as a non-reinforced section. In the case of this structure, when an impact load is input to the front pillar from a side in front of the vehicle, a rear region of the closed cross section of the front pillar is crushed and deformed (plastically deformed), and the energy of the impact load is absorbed by the crush deformation.

SUMMARY

In the vehicle body side part structure disclosed in Japanese Patent No. 6156258, a lower end of the front pillar is connected to an upper section of a side sill in which a closed cross section is continuous in a vehicle forward/rearward direction. For this reason, when an impact load is input to the front pillar from a side in front of the vehicle, there is a concern that the front end portion of the side sill will remain after crushing when the closed cross section of the front pillar is crushed and deformed. An improvement is desired with regard to this from the viewpoint of absorbing more energy of an impact load.

An aspect of the present invention provides a vehicle body side part structure capable of efficiently absorbing an impact load input from a side in front of a front pillar using plastic deformation of the front pillar and a front region of a side sill.

A vehicle body side part structure according to an aspect of the present invention includes: a front pillar extending substantially in a vehicle upward/downward direction at a position behind a front wheel; and a side sill extending substantially in a vehicle forward/rearward direction at a position below a vehicle side part and having a front end portion coupled to a lower edge portion of the front pillar, wherein the front pillar includes: a pillar inner panel disposed on an inner side in a vehicle width direction; and a pillar outer panel joined to the pillar inner panel on an outer side in the vehicle width direction and forming a closed cross section substantially in the vehicle upward/downward direction together with the pillar inner panel, the side sill includes: a sill inner panel disposed on an inner side in the vehicle width direction; and a sill outer panel joined to the sill inner panel on an outer side in the vehicle width direction and forming a closed cross section substantially in the vehicle forward/rearward direction together with the sill inner panel, a sidewall and a front wall of the pillar outer panel on an inner side in the vehicle width direction extend downward to a position at which the sidewall and the front wall overlap the side sill in an upward/downward direction, a defective section that forms a non-continuous section with respect to the front wall of the pillar outer panel is provided on a front section of the sidewall of the sill outer panel on an outer side in the vehicle width direction, a reinforcement plate extending in the vehicle upward/downward direction is coupled to a region in an inner side surface of the pillar outer panel that is a rear section of the closed cross section of the front pillar, a lower end of the reinforcement plate extends to a position at which the lower end overlaps the defective section in the upward/downward direction on a side behind the defective section, and a lower edge portion of the sidewall of the pillar outer panel is joined to a sidewall of the sill outer panel on an outer side in the vehicle width direction.

According to the above-mentioned configuration, when an impact load is input to the front section of the front pillar from the side of a front wheel, the front region of the closed cross section is first crushed and deformed to leave the rear region of the closed cross section of the front pillar reinforced by the reinforcement plate. Here, in the forward portion of the side sill, the portion having a relatively low rigidity in front of the extension region of the reinforcement plate is also crushed and deformed. In the forward portion of the side sill, the defective section is provided on the front section of the sidewall of the sill outer panel on the outer side in the vehicle width direction, the defective section is covered by the sidewall of the lower edge portion of the pillar outer panel, and the lower edge portion of the reinforcement plate extends at the rear section of the defective section. For this reason, the forward portion of the side sill is easily plastically deformed without uncrushed parts remaining on the front side of the extension section of the reinforcement plate with high rigidity upon input of an impact load from the front of the front pillar. As a result, energy of the input impact load is absorbed by plastic deformation of the front pillar and the front region of the side sill.

The sill outer panel may have a bottom wall section configured to cover the front pillar from below at a position at which the defective section is located in the vehicle forward/rearward direction.

In this case, since the front pillar is covered with the bottom wall section of the sill outer panel from below, entry of water or dust into the front pillar can be prevented without adding a separate lid member, and moreover, the wheel is pushed out of the vehicle when an impact load is input from the front of the front pillar, and entry of the wheel into the passenger compartment can be minimized.

At least a part of the pillar outer panel may be formed in a substantially hat-shaped cross-sectional shape having an opening that opens inward in the vehicle width direction and having a front corner section and a rear corner section on an outer side in the vehicle width direction, and at least a part of the reinforcement plate may be formed in a substantially L-shaped cross-sectional shape along an inner surface of the rear corner section.

In this case, since the rear corner section of the pillar outer panel is efficiently reinforced by the substantially L-shaped cross section of the reinforcement plate, rigidity of the rear region of the closed cross section of the front pillar can be further increased. As a result, the rigidity of the front region of the front pillar is relatively low, and the front region of the front pillar can be more smoothly crushed and deformed upon input of an impact load from the front.

A closed cross-sectional part extending in the vehicle width direction according to a lower dash and a dash cross member may be disposed on the front pillar on an inward side in the vehicle width direction, a bulkhead configured to reinforce the closed cross section may be fixed into the closed cross section of the front pillar, the bulkhead may have a stepped section in which a bent ridge line extends substantially in the vehicle width direction, and the bent ridge line of the stepped section may be substantially linearly aligned with a bent ridge line of the closed cross-sectional part according to the lower dash and the dash cross member.

In this case, the stepped section of the bulkhead is efficiently reinforced by the bent ridge line of the closed cross-sectional part constituted by the lower dash and the dash cross member that are continuous in the vehicle width direction. For this reason, the forward-side region of the stepped section of the bulkhead is easily bent and deformed when an impact load is input from the front of the front pillar. As a result, the front region of the front pillar is easily crushed and deformed upon input of an impact load. In addition, when an impact load is input to the front pillar from outwards in the vehicle width direction, the load can be efficiently transmitted to the closed cross-sectional part by the lower dash and the dash cross member through the stepped section of the bulkhead. Further, since the lower dash and the dash cross member are disposed inward from the front pillar in the vehicle width direction such that the bent ridge line of the stepped section of the bulkhead is continuous with the bent ridge line of the closed cross-sectional part by the lower dash and the dash cross member in the vehicle width direction, the bending or twisting rigidity of the front pillar can be efficiently increased.

The stepped section of the bulkhead may be disposed on the side in front of the reinforcement plate.

In this case, when the impact load is input from the front of the front pillar, the reinforcement plate is less likely to interfere with the deformation of the front region of the front pillar starting from the stepped section of the bulkhead. For this reason, the amount of the energy of an impact load absorbed can be increased due to the deformation of the front region of the front pillar starting from the stepped section.

The lower edge portion of the pillar outer panel may have a sidewall directed outward in the vehicle width direction and a front wall directed in a vehicle frontward direction, the sidewall may be coupled to the sidewall of the sill outer panel on an outer side in the vehicle width direction, and the front wall may be coupled to an outrigger that connects a front section of the side sill to a rear section of the front side frame.

In this case, the front corner section constituted by the sidewall and the front wall can be formed on the front side of the extension section below the reinforcement plate. In addition, since the front wall of the lower edge portion of the pillar outer panel is coupled to the outrigger, support rigidity of the lower edge portion of the pillar outer panel on the inner side in the vehicle width direction can be increased.

A jack-up plate may be disposed in a front end region of the side sill, and the jack-up plate may include: a main body plate section extending in the closed cross section of the front pillar in a direction substantially perpendicular to the vehicle width direction; and an upper flange bent outward from an upper section of the main body plate section in the vehicle width direction and having an upper surface coupled to a lower surface of a rearward-side region further than the stepped section of the bulkhead.

In this case, the load input from below the jack-up plate can be supported by the closed cross section of the front pillar through the rearward-side region further than the stepped section of the bulkhead. In addition, since the upper flange of the jack-up plate is coupled to the rearward-side region further than the stepped section of the bulkhead, when the impact load is input to the front pillar from the front, the upper flange does not interfere with the crush deformation of the front region of the front pillar.

The jack-up plate further may have a front bent section bent inward from a front end portion of the main body plate section in the vehicle width direction, the main body plate section may be sandwiched and fixed between joining sections of the sill inner panel and the sill outer panel, and the front bent section may be coupled to an outrigger that connects together the front section of the side sill and the front side frame.

In this case, the portion of the lower region of the front pillar on the inner side in the vehicle width direction is reinforced by the main body plate section and the front bent section of the jack-up plate. For this reason, when the impact load is input to the front corner section of the pillar outer panel from the front side of the front pillar, the front region of the front pillar is easily deformed about the front corner section.

A second bulkhead configured to reinforce the closed cross section may be fixed into the closed cross section of the side sill, and the second bulkhead may be disposed in a region of the side sill below the front pillar and at a vehicle rearward position further than a curved section extending downward and rearward.

In this case, since the second bulkhead is disposed at a position in the closed cross section of the side sill closer to the side behind the vehicle than the curved section of the front pillar, when the impact load is input to the front pillar from the front, crush deformation of the cross section of the side sill due to the load transmitted to the lower end of the curved section can be efficiently minimized by the second bulkhead. For this reason, collapse of the front pillar rearward due to crushing of the cross section of the side sill can be minimized.

The sill outer panel may have a sidewall directed outward in the vehicle width direction and an upper wall extending to be bent inward from an upper end portion of the sidewall in the vehicle width direction, a rear lower region of the pillar outer panel may extend to be curved toward a vehicle rearward side and the rear corner section may be coupled to the sidewall and the upper wall of the sill outer panel, the reinforcement plate may have: a reinforcement plate main body section directed outward in the vehicle width direction; and a vehicle width extension section extending to be bent inward from a rear section of the reinforcement plate main body section in the vehicle width direction, and a gap may be set between a lower end of the vehicle width extension section of the reinforcement plate and the upper wall of the sill outer panel.

In this case, since the rear corner section of the region below the rear section of the pillar outer panel is coupled to the sidewall and the upper wall of the sill outer panel, a rearward collapsing load applied to the front pillar can be efficiently received by the upper wall of the sill outer panel. For this reason, rearward collapse of the front pillar can be minimized. In addition, since the gap is set between the lower end of the vehicle width extension section of the reinforcement plate and the upper wall of the sill outer panel, even when there are manufacturing errors or the like in the reinforcement plate, upon assembly of the pillar outer panel and the sill outer panel, the lower end of the vehicle width extension section of the reinforcement plate does not interfere with the upper wall of the sill outer panel. Accordingly, when this configuration is employed, there is no problem in the assembly work of the pillar outer panel and the sill outer panel.

A reinforcement bead extending in the vehicle width direction may be provided on the vehicle width extension section of the reinforcement plate.

In this case, the rigidity of the closed cross section of the front pillar in the vehicle width direction can be efficiently increased by the reinforcement bead provided on the vehicle width extension section of the reinforcement plate. In addition, even when the reinforcement plate is formed by a high strength steel plate, occurrence of unnecessary molding wrinkles is minimized by the shape of the reinforcement bead, the rear corner section of the pillar outer panel and the vehicle width extension section of the reinforcement plate accurately overlap each other, and thus, the front end portion of the extension section of the reinforcement plate main body section can be disposed to be substantially linearly aligned with the longitudinal wall facing the defective section of the sill outer panel in the upward/downward direction.

An upper region of the reinforcement plate may be inclined forward and downward from an upper end toward the front wheel.

In this case, when an impact load is input to the front pillar from the front wheel, the input load can be efficiently transmitted from the front pillar toward the roof side rail through the inclined portion of the upper region of the reinforcement plate.

A hinge fixing section configured to fix a door hinge may be provided on the reinforcement plate.

In this case, since the hinge fixing section is provided on the reinforcement plate in which deformation is unlikely to occur upon input of the impact load, opening failures of the front door due to deformation of the hinge fixing section can be minimized.

In the aspect of the present invention, the defective section is provided on the front section of the sidewall of the sill outer panel on the outer side in the vehicle width direction, the defective section is covered with the sidewall of the lower edge portion of the pillar outer panel, and the lower edge portion of the reinforcement plate extends at the rear section of the defective section. For this reason, the impact load input from the front of the front pillar can be efficiently absorbed by plastic deformation of the front pillar and the front region of the side sill, and the rear region can be strengthened and the load can be transmitted to the roof side rail and the rear region of the side sill.

DESCRIPTION OF EMBODIMENTS

Hereinafter, an embodiment of the present invention will be described with reference to the accompanying drawings. Further, in appropriate places in the drawings, an arrow FR indicates a forward direction with respect to a vehicle 1, an arrow UP indicates an upward direction with respect to the vehicle 1, and an arrow LH indicates a leftward direction with respect to the vehicle 1. In addition, in the following description, the leftward and rightward directions mean leftward and rightward directions when directed toward a side in front of the vehicle.

Figure 1:
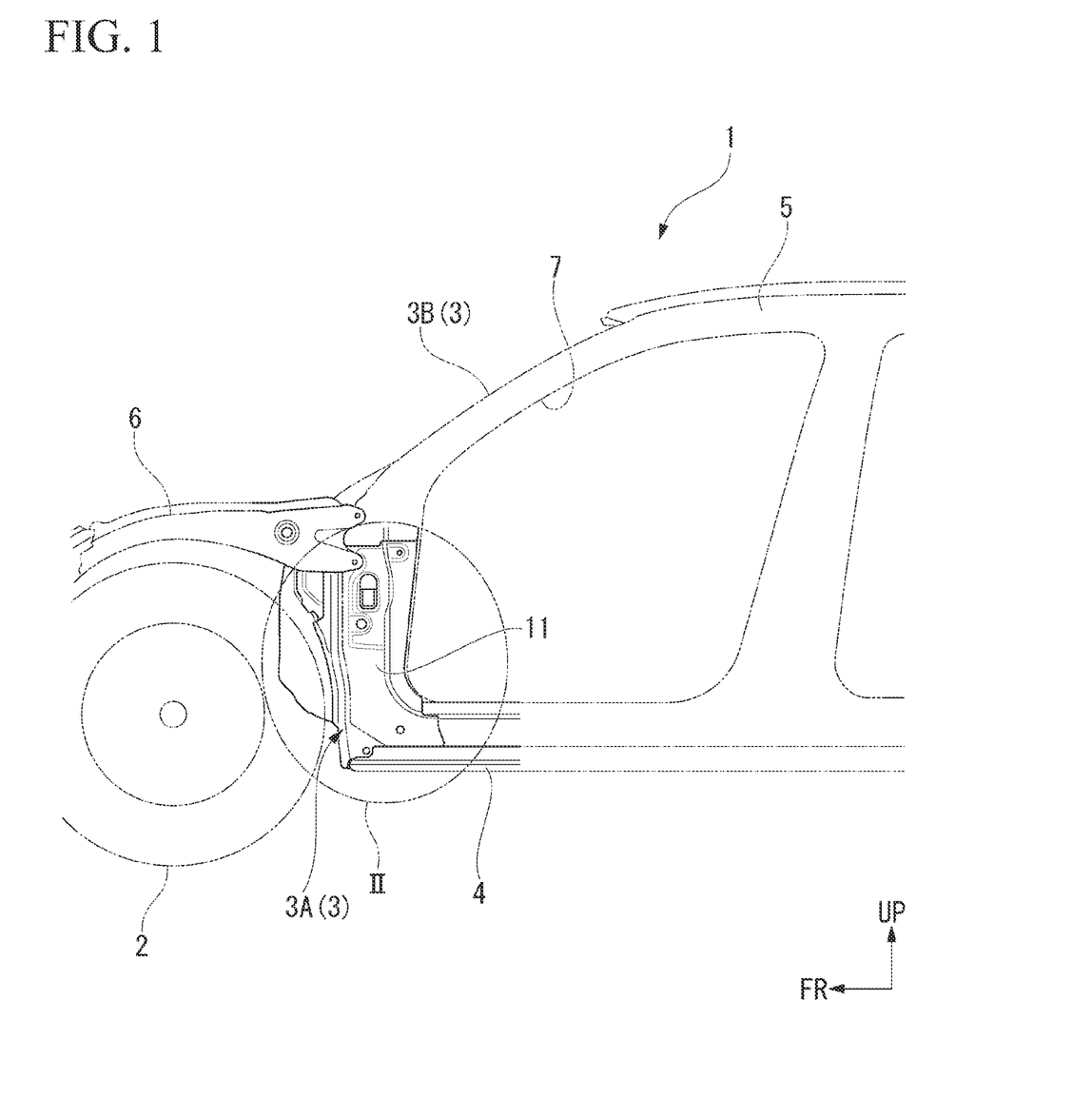
FIG. 1 is a side view of a vehicle of an embodiment.

FIG. 1 is a left side view of a skeleton section of the vehicle 1 of the embodiment. In FIG. 1, parts other than major parts are shown by virtual lines.

In the vehicle 1, front pillars 3 are disposed at positions behind left and right front wheels 2, and side sills 4 are disposed at positions below the outer side of the passenger compartment in a vehicle width direction. The front pillars 3 have lower pillars 3A extending upward from front end portions of the side sills 4, and upper pillars 3B extending inclined upward to a vehicle rear section from upper end portions of the lower pillars 3A toward front end portions of roof side rails 5.

Hereinafter, the lower pillars 3A are simply referred to as the front pillars 3 unless the context clearly indicates otherwise.

Further, outer panels (not shown) configured to cover the outside of the side portions of the vehicle body are joined to the outer side of the left and right front pillars 3 and the side sills 4 of the vehicle body in the vehicle width direction.

The side sills 4 extend substantially in the vehicle forward/rearward direction at positions below the side portions of the vehicle.

The front end portions of the side sills 4 are connected to the lower end portions of the front pillars 3 corresponding to the left and right sides.

Further, reference sign 6 in FIG. 1 designates upper members extending from upper end positions of the lower pillars 3A of the front pillars 3 toward the front of the vehicle, and reference sign 7 designates door openings of the side parts of the vehicle body to which front doors (not shown) are attached which can be opened and closed.

Figure 2:
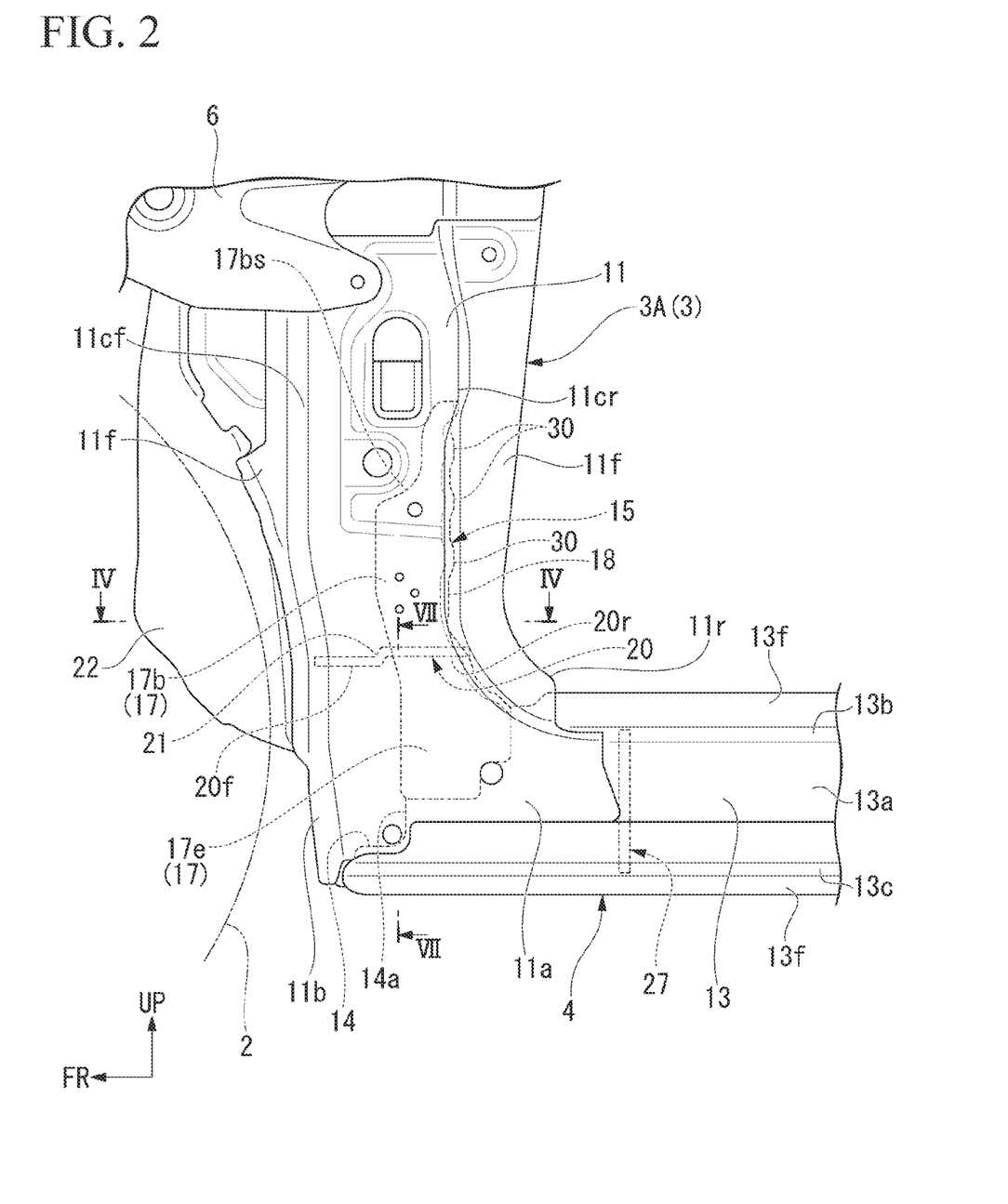
FIG. 2 is an enlarged side view of a portion II in FIG. 1.
Figure 3:
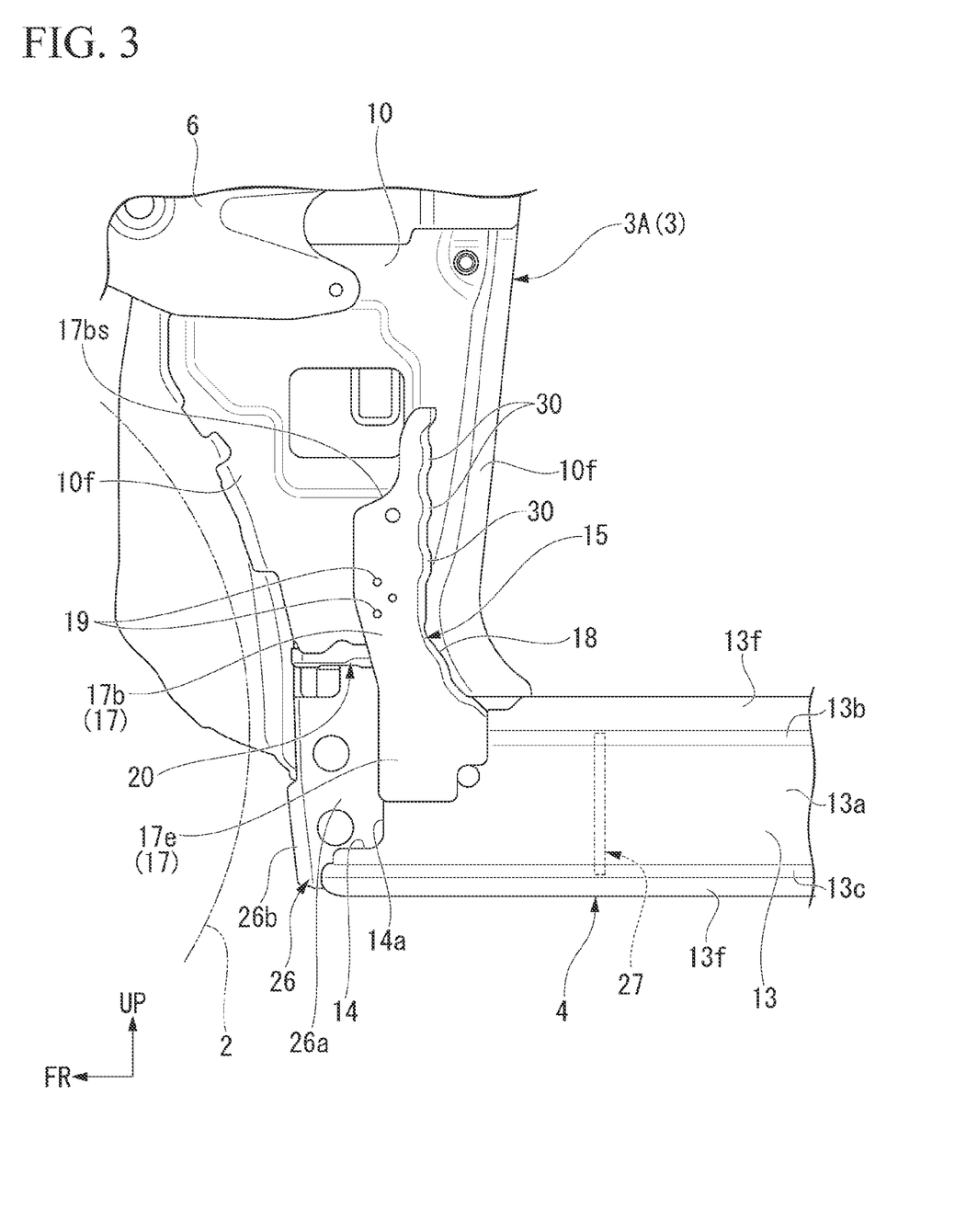
FIG. 3 is a side view in which some members are removed from FIG. 2.
Figure 4:
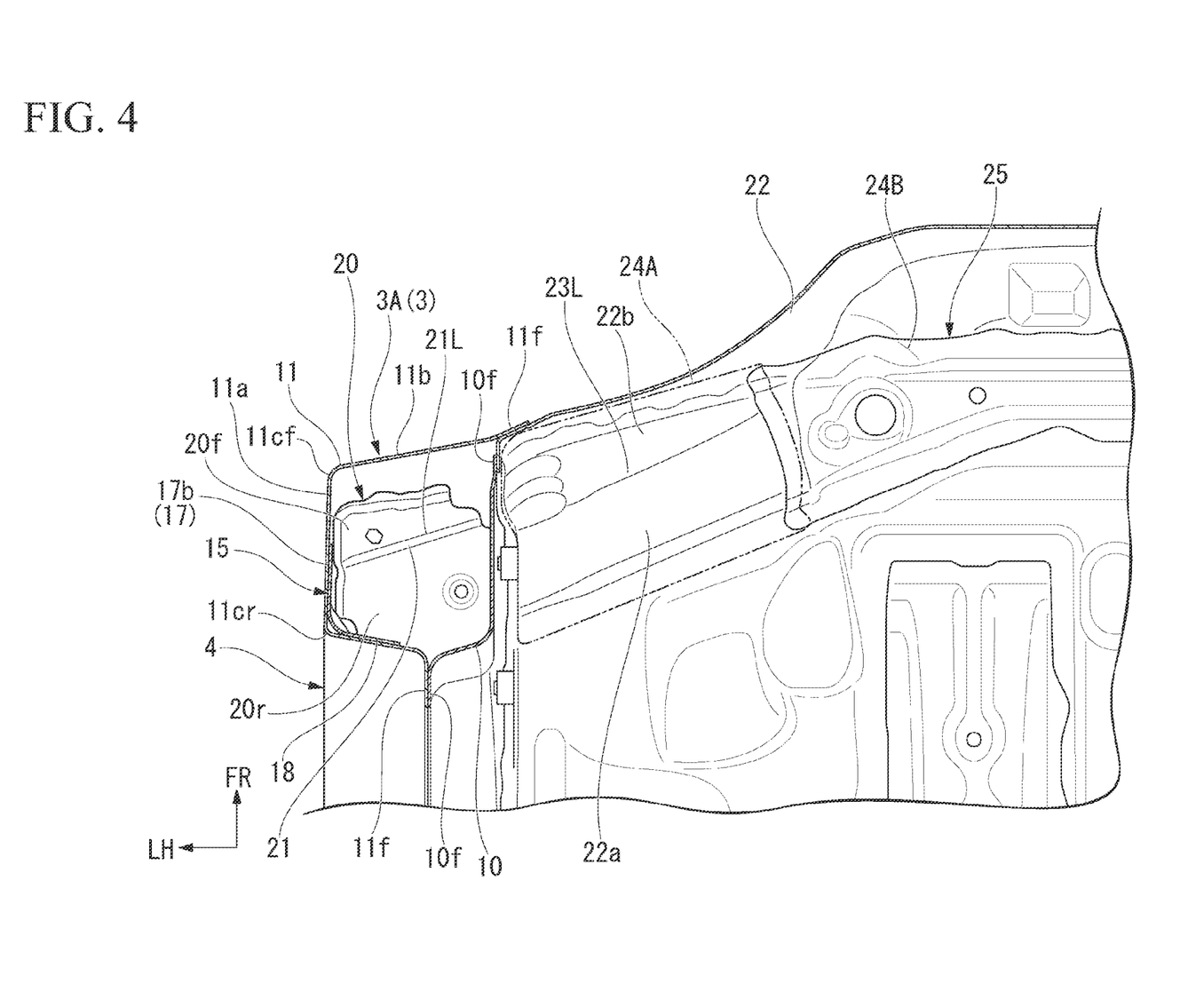
FIG. 4 is a cross-sectional view taken along a line IV-IV in FIG. 2.
Figure 5:
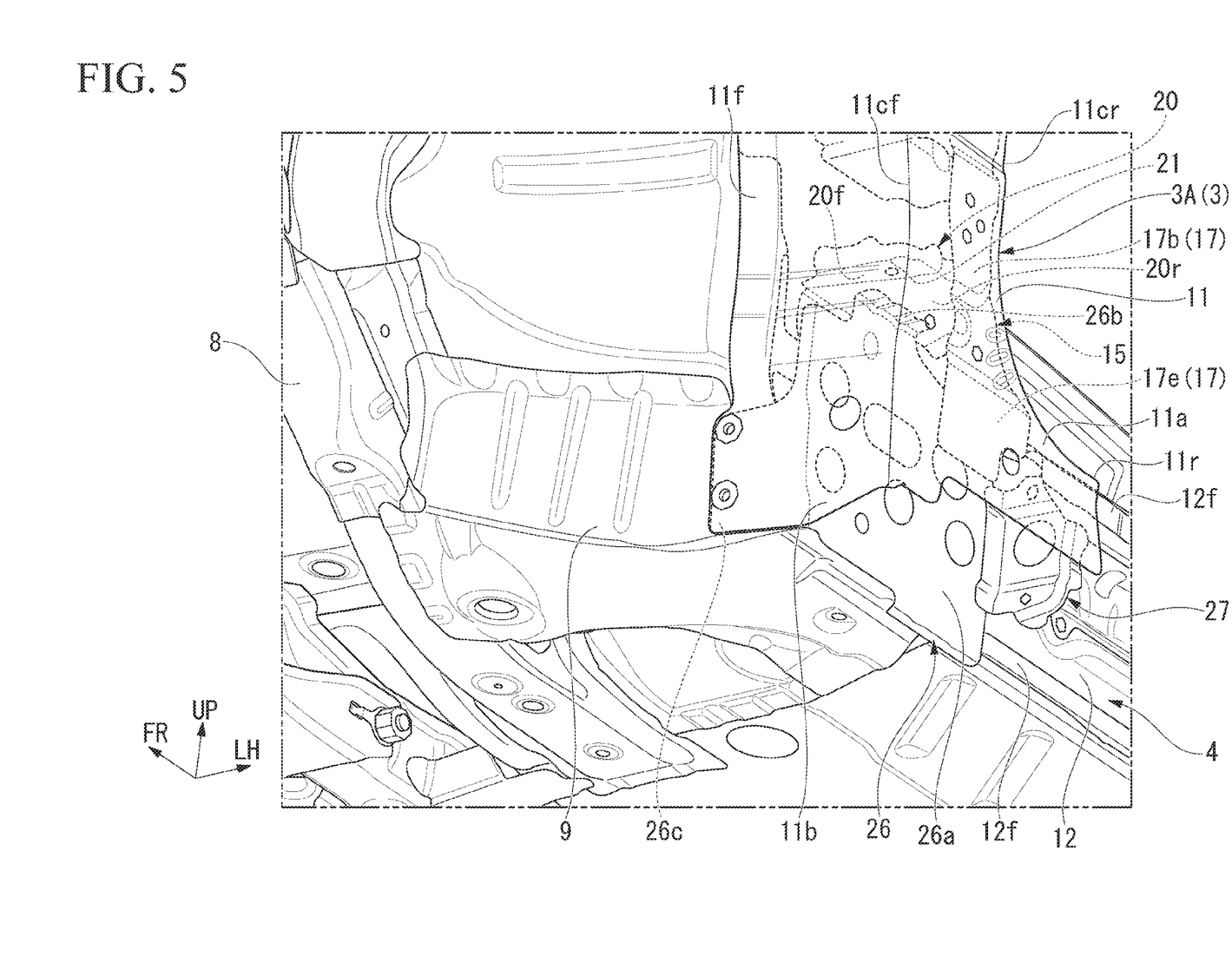
FIG. 5 is a perspective view in which some parts of a front pillar portion of the vehicle of the embodiment are removed.
Figure 6:
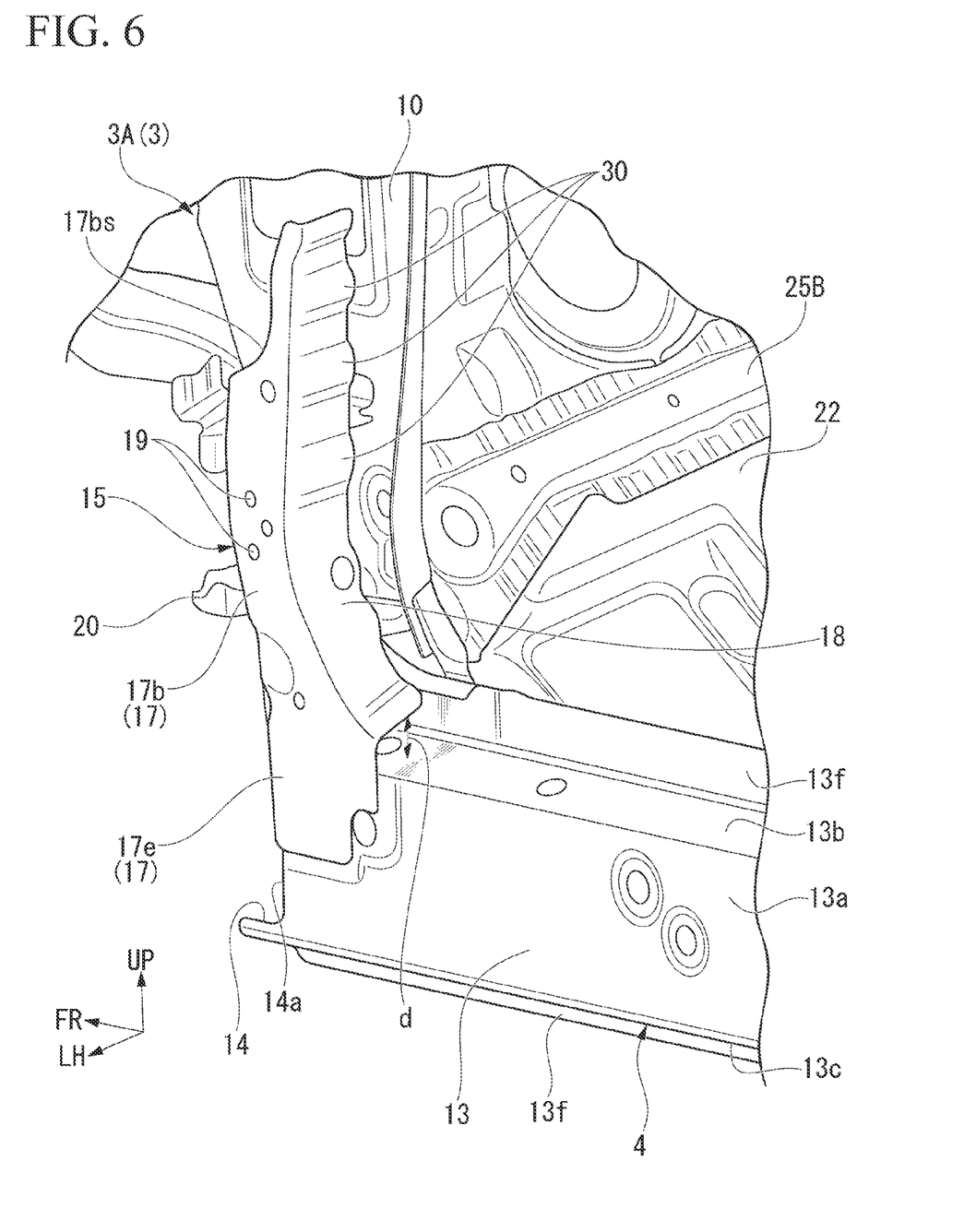
FIG. 6 is a perspective view in which some parts of the front pillar portion of the vehicle of the embodiment are removed.
Figure 7:
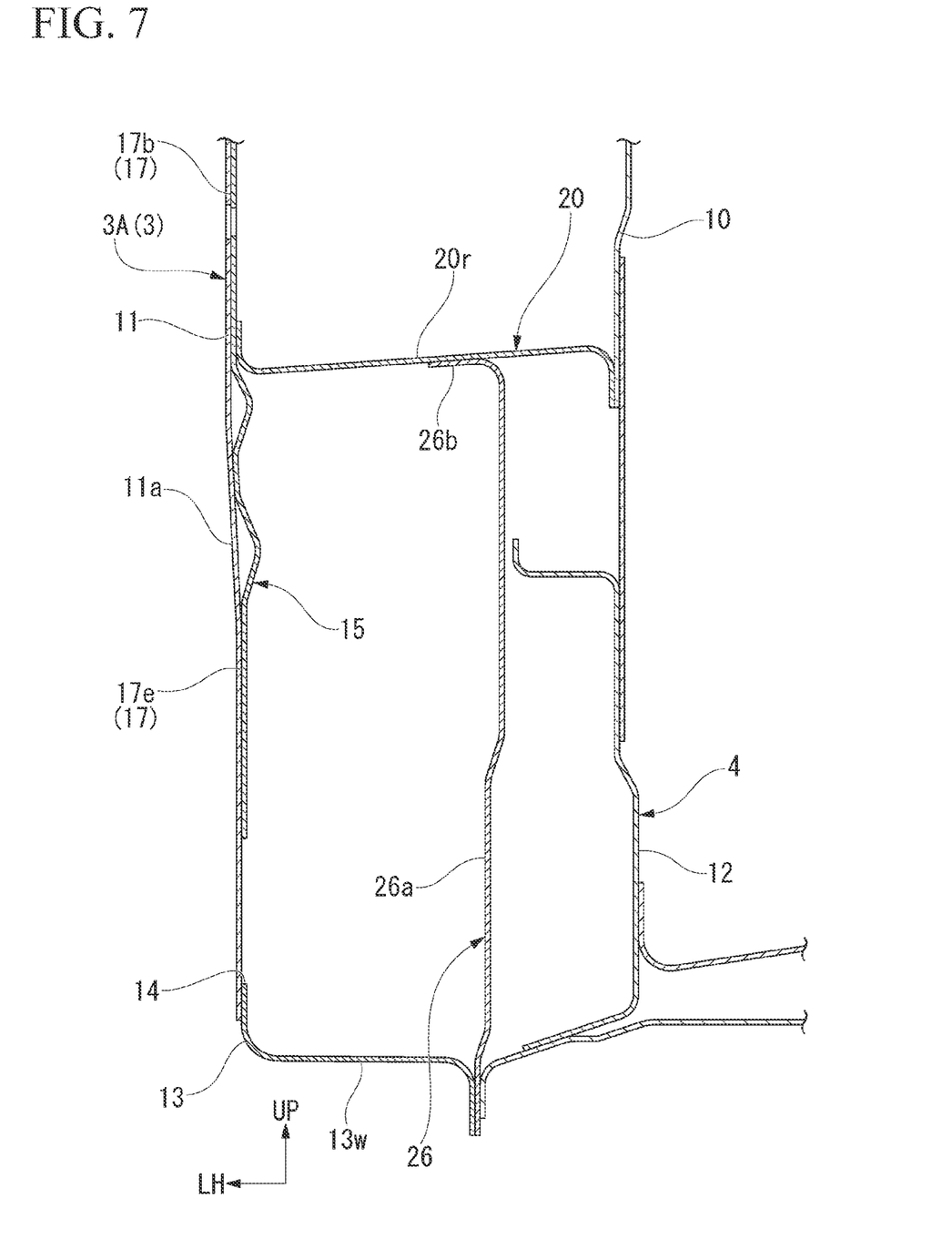
FIG. 7 is a cross-sectional view taken along a line VII-VII in FIG. 2.

FIG. 2 is an enlarged view of a portion II in FIG. 1, and FIG. 3 is a view in which some members (pillar outer panels 11) are removed from FIG. 2. FIG. 4 is a cross-sectional view taken along line IV-IV in FIG. 2. FIG. 5 is a view showing a lower end position of the front pillar 3 of the vehicle body from diagonally below a front section thereof, and FIG. 6 is a view showing the lower end position of the front pillar 3 of the vehicle body from diagonally above a rear section thereof. In addition, FIG. 7 is a cross-sectional view taken along line VII-VII in FIG. 2.

The front pillars 3 have pillar inner panels 10 disposed on an inner side in the vehicle width direction, and the pillar outer panels 11 disposed outward from the pillar inner panels 10 in the vehicle width direction.

The pillar inner panels 10 and the pillar outer panels 11 are joined to each other to form a substantially rectangular closed cross section extending substantially in the vehicle upward/downward direction.

As shown in FIG. 4, a main part of the pillar inner panels 10 and the pillar outer panels 11 (a region except a lower edge portion) is formed in a horizontal cross-sectional shape having substantially a hat shape. In the pillar inner panels 10 and the pillar outer panels 11, front and rear flange sections 10f and 11f are coupled to each other. The horizontal cross section of the general part of the pillar outer panel 11 has a front corner section 11cf and a rear corner section 11cr disposed on outer sides in the vehicle width direction and having openings directed inward in the vehicle width direction. In addition, as shown in FIG. 7, the lower edge portions of the pillar outer panels 11 extend downward from the lower ends of the pillar inner panels 10.

As shown in FIG. 5, the lower edge portions of the pillar outer panels 11 have sidewalls 11a directed outward in the vehicle width direction (extending in a direction perpendicular to the vehicle width direction), and front walls 11b directed toward the side in front of the vehicle (extending in a direction substantially perpendicular to the vehicle forward/rearward direction). Accordingly, the lower edge portion of the pillar outer panel 11 has a horizontal cross-sectional shape that is substantially an L shape. The sidewalls 11a and the front walls 11b of the lower edge portions of the pillar outer panels 11 extend to positions at which they overlap the side sills 4 in the upward/downward direction. The front walls 11b of the lower edge portions of the pillar outer panels 11 are coupled to front surfaces of outriggers 9 configured to connect the front sections of the side sills 4 to rear sections of front side frames 8.

The side sills 4 have sill inner panels 12 disposed on inner sides in the vehicle width direction, and sill outer panels 13 disposed outward from the sill inner panels 12 in the vehicle width direction. The sill inner panels 12 and the sill outer panels 13 are coupled to each other, and form a substantially rectangular closed cross section extending substantially in the vehicle forward/rearward direction.

A general part of the sill inner panels 12 and the sill outer panels 13 (a region except the front edge portion) is formed in a vertical cross-sectional shape having substantially a hat shape. In the sill inner panels 12 and the sill outer panels 13, upper and lower flange sections 12f and 13f are coupled to each other. The sill outer panels 13 have sidewalls 13a directed outward in the vehicle width direction (extending in a direction perpendicular to the vehicle width direction), upper walls 13b extending to be bent inward from the upper end portions of the sidewalls 13a in the vehicle width direction, and lower walls 13c extending to be bent inward from the lower end portions of the sidewalls 13a in the vehicle width direction.

As shown in FIG. 2, in the front edge portions of the sill outer panels 13, parts of the sidewalls 13a, the upper walls 13b and the upper flange sections 13f are cut out. The front end portions of the sidewalls 13a are cutout in a substantially longitudinal or lateral rectangular shape such that upper and front sides are open. The substantially rectangular cutout portions configure defective sections 14 that form non-continuous sections with the front walls 11b of the pillar outer panels 11.

Here, as shown in FIG. 2, a region below the rear section of the pillar outer panel 11 extends toward a side behind the vehicle such that a longitudinal width gradually increases. The portion is referred to as a curved section 11r. The rear corner sections 11cr of the pillar outer panels 11 have a direction that gradually changes toward a side below the rear section together with a variation in shape of the curved section 11r, and two surfaces that sandwich the rear corner section 11cr are joined to the sidewalls 13a and the upper walls 13b of the sill outer panels 13 through welding or the like.

In addition, the sidewalls 11a of the lower edge portions of the pillar outer panels 11 cover the defective sections 14 of the front edges of the sill outer panels 13 from the outward side in the vehicle width direction, and are joined to the side edge portions of the defective sections 14 of the sidewalls 13a of the sill outer panels 13 through welding or the like.

Here, in the front edge portions of the sill outer panels 13, as described above, only the parts of the sidewalls 13a, the upper walls 13b and the upper flange section 13f are cutout, and the lower walls 13c and the lower flange section 13f are not cutout. The lower walls 13c of the front edge portion remaining without being cut out constitute bottom wall sections 13w (see FIG. 7) that cover the front pillars 3 from below at positions in the vehicle forward/rearward direction where the defective sections 14 are disposed. In addition, a joining section between a main body plate section 26a of a jack-up plate 26 and the lower flange section 13f of the sill outer panel 13 extends in front of the lower wall 13c of the front edge portion.

A reinforcement plate 15 extending substantially in the vehicle upward/downward direction is coupled to a region of the inner side surface of the pillar outer panel 11 that becomes the rear section of the closed cross section of the front pillar 3. The reinforcement plate 15 is formed of a high strength steel plate having a large thickness or the like. As shown in FIG. 6 or the like, the reinforcement plate 15 includes a reinforcement plate main body section 17 directed outward in the vehicle width direction (extending in a direction perpendicular to the vehicle width direction), and a vehicle width extension section 18 extending to be bent inward substantially at a right angle from the rear section of the reinforcement plate main body section 17 in the vehicle width direction.

The reinforcement plate main body section 17 is constituted by a base section 17b disposed above the side sill 4, and an extension section 17e extending upward from the base section 17b. The base section 17b is joined to an inner surface of the sidewall 11a of the pillar outer panel 11 above the side sill 4. A lower end of the extension section 17e extends to a position behind the defective section 14 of the sill outer panel 13 at which it overlaps the defective sections 14 in the upward/downward direction. More specifically, the lower end of the extension section 17e is joined to a side surface of the sidewall 13a of the sill outer panel 13 on an outer side in the vehicle width direction. The extension section 17e is joined to the inner surface of the sidewall 11a of the pillar outer panel 11 in this state. In this state, as shown in FIG. 2, the front end portion of the extension section 17e is disposed to be substantially linearly aligned with a longitudinal wall 14a facing the defective section 14 of the pillar outer panel 11 in the upward/downward direction. The defective section 14 is disposed in front of the extension section 17e (the extension region) of the reinforcement plate 15.

In addition, an inclined section 17bs inclined forward and downward from the upper end in a direction of the front wheel 2 of the vehicle 1 is provided on an upper region of the base section 17b of the reinforcement plate main body section 17. Further, a hinge fixing hole 19 (a hinge fixing section) configured to fix a door hinge is formed in a central region of the base section 17b in the upward/downward direction.

The vehicle width extension section 18 is bent inward from the rear end position of the base section 17b of the reinforcement plate main body section 17 in the vehicle width direction. As shown in FIG. 4, the base section 17b and the vehicle width extension section 18 are formed in a substantially L-shaped horizontal cross-sectional shape along the inner surface of the rear corner section 11cr of the pillar outer panel 11. The reinforcement plate 15 is coupled to the inner surface of the pillar outer panel 11 along the inner surface of the rear corner section 11cr of the pillar outer panel 11. The rear edge portion of the base section 17b and the vehicle width extension section 18 are curved toward the lower end on the side behind the vehicle along the shape of the curved section 11r of the pillar outer panel 11. As shown in FIG. 6, the lower end of the vehicle width extension section 18 faces the upper wall 13b of the sill outer panel 13 with a predetermined gap d interposed therebetween. Accordingly, the gap d is set between the lower end of the vehicle width extension section 18 and the upper wall 13b of the sill outer panel 13.

In addition, reinforcement beads 30 extending substantially in the vehicle width direction are integrally formed at a plurality of places separated in the upward/downward direction of the vehicle width extension section 18. The reinforcement bead 30 has a convex cross section that extends toward the side behind the vehicle substantially in the vehicle width direction.

A bulkhead 20 configured to reinforce the closed cross section is fixed into the closed cross section of the lower region of the front pillar 3 (the region not overlapping with the side sill 4 in the upward/downward direction). A stepped section 21 having a bent ridge line 21L extending substantially in the vehicle width direction is formed in the bulkhead 20. A forward-side region 20f of the bulkhead 20 is formed below a rearward-side region 20r with the stepped section 21 sandwiched therebetween. The bulkhead 20 is disposed in the closed cross section of the front pillar 3 to be substantially perpendicular to the reinforcement plate main body section 17 and the vehicle width extension section 18 of the reinforcement plate 15 disposed adjacent to the rear corner section 11cr of the pillar outer panel 11. The stepped section 21 of the bulkhead 20 is disposed closer to the side in front of the closed cross section of the front pillar 3 than the reinforcement plate 15.

As shown in FIG. 4, a lower dash 22 is connected to an inner side of the front pillar 3 in the vehicle width direction. The lower dash 22 is plate-shaped member that partitions a space between below the front section of the passenger compartment and the engine compartment, and a bent ridge line 23L is provided at a portion in which a front wall 22b stands upward from a front end portion of a bottom wall 22a. Dash cross members 24A and 24B extending substantially in the vehicle width direction are attached to the bottom wall 22a and the front wall 22b of the lower dash 22. The dash cross members 24A and 24B constitute a closed cross-sectional part 25 extending substantially in the vehicle width direction together with the lower dash 22. In the case of the embodiment, the bent ridge line 21L of the stepped section 21 of the bulkhead 20 is aligned substantially linearly with the bent ridge line 23L of the lower dash 22 (the bent ridge line of the closed cross-sectional part 25 by the lower dash 22, the dash cross members 24A and 24B).

Further, when the bent ridge line extending substantially in the vehicle width direction is provided on the dash cross members 24A and 24B, the bent ridge line 21L of the stepped section 21 of the bulkhead 20 may be aligned substantially linearly with the bent ridge line of the dash cross members 24A and 24B.

In addition, as shown in FIG. 3 and FIG. 5, the jack-up plate 26 having a large thickness and high rigidity is disposed at the portion of the front end region of the side sill 4 on the inner side in the vehicle width direction. The jack-up plate 26 is a plate member having a lower end with which an elevation part of a jack-up apparatus abuts upon jack-up of the vehicle.

The jack-up plate 26 has the main body plate section 26a extending in a direction substantially perpendicular to the vehicle width direction while crossing the inside of the closed cross section of the front pillar 3 and the inside of the closed cross section of the side sill 4, an upper flange 26b bent outward from the upper end portion of the main body plate section 26a at substantially a right angle in the vehicle width direction, and a front bent section 26c bent inward from the front end portion of the main body plate section 26a at substantially a right angle in the vehicle width direction.

The main body plate section 26a is sandwiched between the joining sections of the sill inner panels 12 and the sill outer panels 13, and coupled to both of the panels through welding, bolt fastening, rivet fastening, or the like. The elevation part of the jack-up apparatus is pressed against the lower end of the main body plate section 26a. The front bent section 26c having an extension end on an inner side in the vehicle width direction that overlaps the front surface of the outrigger 9, and fixed to the front surface of the outrigger 9 together with the front wall 11b of the lower edge portion of the pillar outer panel 11 through bolt fastening, rivet fastening, or the like. In addition, the upper end portion of the main body plate section 26a extends upward from the inside of the closed cross section of the front pillar 3. The upper flange 26b continuously provided on the upper end portion of the main body plate section 26a is coupled to the lower surface of the rearward-side region 20r further than the stepped section 21 of the bulkhead 20.

In addition, a second bulkhead 27 configured to reinforce the closed cross section is fixed into the closed cross section at a position close to the front section of the side sill 4. The second bulkhead 27 is disposed at a position in the closed cross section of the side sill 4 rearward in the vehicle from the rear end portion of the curved section 11r of the pillar outer panel 11, and joined to the main body plate section 26a of the jack-up plate 26 through welding, an adhesive agent, or the like.

In the above-mentioned configuration, when an impact load is input to the front section of the front pillar 3 of the vehicle 1 from the side of the front wheel 2, the front region of the closed cross section of the front pillar 3 is previously crushed and deformed to leave the rear region of the closed cross section of the front pillar 3 reinforced by the reinforcement plate 15. Here, in the forward portion of the side sill 4, a portion of the reinforcement plate 15 having a relatively low rigidity in front of the extension region (a portion in which the defective section 14 is disposed) is also crushed and deformed.

In the forward portion of the side sill 4, the defective section 14 is provided on the front section of the sidewall 13a of the sill outer panel 13 on the outer side in the vehicle width direction, the sidewall 11a of the lower edge portion of the pillar outer panel 11 is coupled to the sidewall 13a of the sill outer panel 13 to cover the defective section 14, and the extension section 17e of the reinforcement plate 15 extends toward the rear section of the defective section 14.

For this reason, when an impact load is input to the front pillar 3 from the front, on the front side of the extension section (the extension section 17*e*) of the reinforcement plate 15 with high rigidity, the forward portion of the side sill 4 is easily plastically deformed without being crushed.

Accordingly, when the vehicle body side part structure of the embodiment is employed, energy of the input impact load is efficiently absorbed by plastic deformation of the front regions of the front pillar 3 and the side sill 4, the rear region is strengthened and the load is transmitted toward the roof side rail 5 and the rear region of the side sill 4, and thus, an occupant can be protected.

In addition, in the vehicle body side part structure of the embodiment, the extension section 17*e* of the reinforcement plate 15 is joined to an outer surface of the sill outer panel 13 in the vehicle width direction. For this reason, it is possible to linearly extend the reinforcement plate main body section 17 of the reinforcement plate 15 downward. Accordingly, when this configuration is employed, the load transmitted to the upper region (the base section 17*b*) of the reinforcement plate 15 can be easily supported on the side of the side sill 4 in a distributed manner, and processing of the reinforcement plate 15 also becomes easy.

In addition, in the vehicle body side part structure of the embodiment, the bottom wall section 13*w* configured to cover the front pillar 3 from below at a certain position of the defective section 14 is integrally formed by extending the front edge bottom section of the sill outer panel 13 to the front wall 11*b* of the front pillar 3. For this reason, when this configuration is employed, entry of water or dust into the front pillar 3 is prevented without adding a separate lid member, the wheel 2 is ejected to the outside of the vehicle when an impact load is input from the front of the front pillar 3, and thus, entry of the wheel 2 into the passenger compartment can be prevented.

Further, in the vehicle body side part structure of the embodiment, the reinforcement plate main body section 17 and the vehicle width extension section 18 of the reinforcement plate 15 are formed in a substantially L-shaped cross-sectional shape along the inner surface of the rear corner section 11*cr* of the pillar outer panel 11. For this reason, the rear corner section 11*cr* of the pillar outer panel 11 is efficiently reinforced by the reinforcement plate 15, and rigidity of the rear region of the closed cross section of the front pillar 3 is further increased. Accordingly, when this configuration is employed, rigidity of the front region of the front pillar 3 is relatively low, and the front region of the front pillar 3 can be more smoothly crushed and deformed upon input of an impact load from the front.

In addition, in the vehicle body side part structure of the embodiment, the stepped section 21 is provided on the bulkhead 20 fixed into the closed cross section of the front pillar 3, and the bent ridge line 21L of the stepped section 21 is substantially linearly aligned with the bent ridge line 23L of the closed cross-sectional part 25 by the dash cross members 24A and 24B and the lower dash 22. For this reason, the rigidity of the rearward-side region 20*r* of the stepped section 21 of the bulkhead 20 is increased and when an impact load is input from the front of the front pillar 3, the forward-side region 20*f* of the stepped section 21 of the bulkhead 20 is relatively easily bent and deformed. As a result, the front region of the front pillar 3 is easily crushed and deformed upon input of the impact load.

Further, in this structure, since the bent ridge line 21L of the stepped section 21 of the bulkhead 20 is substantially linearly aligned with the bent ridge line 23L of the closed cross-sectional part 25 by the lower dash 22 and the dash cross members 24A and 24B, upon input of the impact load from outwards in the vehicle width direction, the input load can be efficiently transmitted to the closed cross-sectional part 25 by the lower dash 22 and the dash cross members 24A and 24B through the stepped section 21 of the bulkhead 20. In addition, the bending or twisting rigidity of the front pillars 3 can also be increased efficiently.

In addition, in the vehicle body side part structure of the embodiment, since the stepped section 21 of the bulkhead 20 is disposed on the side in front of the reinforcement plate 15, when an impact load is input from the front of the front pillar 3, the reinforcement plate 15 is less likely to inhibit deformation of the front region of the front pillar 3 starting from the stepped section 21 of the bulkhead 20. Accordingly, when this configuration is employed, the amount of the energy of an impact load absorbed can be increased by deformation of the front region of the front pillar 3 starting from the stepped section 21.

In addition, in the vehicle body side part structure of the embodiment, the sidewall 11*a* of the lower edge portion of the pillar outer panel 11 is coupled to the sidewall 13*a* of the sill outer panel 13, and the front wall 11*b* of the lower edge portion of the pillar outer panel 11 is coupled to the front section of the side sill 4 and the outrigger 9. For this reason, the front corner section 11*cf* of the front pillar 3 constituted by the sidewall 11*a* and the front wall 11*b* can be formed on the side in front of the extension section 17*e* of the reinforcement plate 15. In addition, in this structure, since the front wall 11*b* of the lower edge portion of the pillar outer panel 11 is coupled to the outrigger 9, support rigidity of the lower edge portion of the pillar outer panel 11 on the inner side in the vehicle width direction can be increased.

In addition, in the vehicle body side part structure of the embodiment, the upper flange 26*b* is curved and provided on the main body plate section 26*a* of the jack-up plate 26, and the upper surface of the upper flange 26*b* is coupled to the lower surface of the rearward-side region 20*r* further than the stepped section 21 of the bulkhead 20. For this reason, the load input to the jack-up plate 26 from the jack-up apparatus can be supported on the closed cross section of the front pillar 3 through the rearward-side region 20*r* further than the stepped section 21 of the bulkhead 20. Accordingly, when this configuration is employed, the load input from the jack-up apparatus can be reliably transmitted to the vehicle body.

Further, in the case of this structure, since the upper flange 26*b* of the jack-up plate 26 is coupled to the rearward-side region 20*r* further than the stepped section 21 of the bulkhead 20, when an impact load is input to the front pillar 3 from the front, the upper flange 26*b* does not inhibit the crush deformation of the front region of the front pillar 3.

Further, in the vehicle body side part structure of the embodiment, the front bent section 26*c* is bent and provided in the front end portion of the main body plate section 26*a* of the jack-up plate 26 on the inner side in the vehicle width direction, the main body plate section 26*a* is sandwiched and fixed between the joining sections of the sill inner panels 12 and the sill outer panels 13, and the front bent section 26*c* is coupled to the outrigger 9. For this reason, a portion of the lower region of the front pillar 3 on the inner side in the vehicle width direction can be reinforced by the main body plate section 26*a* and the front bent section 26*c* of the jack-up plate 26. Accordingly, when this configuration is employed, upon input of the impact load from the front, the front region of the front pillar 3 can be reliably deformed about the front corner section 11*cf*.

In addition, in the vehicle body side part structure of the embodiment, the second bulkhead 27 that reinforces the closed cross section of the side sill 4 is disposed at a position of the side sill 4 at a vehicle rearward position further than the curved section 11*r* of the front pillar 3. For this reason, when an impact load is input to the front pillar 3 from the front, crush deformation of the cross section of the side sill 4 by the load transmitted to the lower end of the curved section 11*r* of the front pillar 3 can be efficiently minimized by the second bulkhead 27. Accordingly, when this configuration is employed, it is possible to minimize the collapse of the front pillar 3 to the rear side due to the crush of the cross section of the side sill 4.

In addition, in the vehicle body side part structure of the embodiment, the region of the pillar outer panel 11 below the rear section are curved and extends rearward, and the rear corner section 11*cr* of the terminal section of the region below the rear section is coupled to the sidewall 13*a* and the upper walls 13*b* of the sill outer panel 13. For this reason, the collapse load to the rear side applied to the front pillar 3 upon input of the impact load can be efficiently received by the upper wall 13*b* of the sill outer panel 13. Accordingly, when this configuration is employed, the collapse of the front pillar 3 to the rear side upon input of the impact load can be minimized.

Further, in the case of the embodiment, the gap d is set between the lower end of the vehicle width extension section 18 of the reinforcement plate 15 and the upper wall 13*b* of the sill outer panel 13. For this reason, even when there is a manufacturing error or the like of the reinforcement plate 15, upon assembly of the pillar outer panel 11 and the sill outer panel 13, interference of the lower end of the vehicle width extension section 18 of the reinforcement plate 15 with the upper wall of the sill outer panel 13 can be minimized. Accordingly, when this configuration is employed, the assembly work of the pillar outer panel 11 and the sill outer panel 13 can be easily performed.

In addition, in the vehicle body side part structure of the embodiment, since the reinforcement beads 30 extending in the vehicle width direction are provided on the vehicle width extension section 18 of the reinforcement plate 15, rigidity of the closed cross section of the front pillar 3 in the vehicle width direction can be efficiently increased by the reinforcement beads 30. Further, in the case in which the reinforcement beads 30 are provided on the vehicle width extension section 18 of the reinforcement plate 15, when the reinforcement plate 15 is formed by the high strength steel plate, occurrence of unnecessary molding wrinkles is minimized by the shape of the reinforcement beads 30, the rear corner section 11*cr* of the pillar outer panel 11 and the vehicle width extension section 18 of the reinforcement plate 15 accurately overlap each other, and the front end portion of the extension section 17*e* of the reinforcement plate main body section 17 can be disposed to be substantially linearly aligned with the longitudinal wall 14*a* facing the defective section 14 of the sill outer panel 13 in the upward/downward direction.

Further, in the case of the embodiment, since the upper region of the reinforcement plate 15 is inclined forward and downward from the upper end toward the front wheel 2, when an impact load is input to the front pillar 3 from the front wheel 2, the input load can be efficiently transmitted from the front pillar 3 toward the roof side rail 5 through the inclined portion of the upper region of the reinforcement plate 15.

In addition, in the case of the embodiment, since the hinge fixing hole 19 (the hinge fixing section) is provided in the reinforcement plate 15 in which deformation cannot easily occur upon input of the impact load, opening failures of the front door due to deformation of the circumferential region of the hinge fixing hole 19 upon input of the impact load can be minimized.

Further, the present invention is not limited to the above-mentioned embodiment and various design changes may be made without departing from the scope of the present invention.

For example, the front end portion of the extension section 17*e* of the reinforcement plate main body section 17 may be offset forward and rearward in the upward/downward direction with respect to the longitudinal wall 14*a* facing the defective section 14 of the sill outer panel 13.

What is claimed is:

1. A vehicle body side part structure comprising:
a front pillar extending substantially in a vehicle upward/downward direction at a position behind a front wheel; and
a side sill extending substantially in a vehicle forward/rearward direction at a position below a vehicle side part and having a front end portion coupled to a lower edge portion of the front pillar,
wherein the front pillar includes:
a pillar inner panel disposed on an inner side in a vehicle width direction; and
a pillar outer panel joined to the pillar inner panel on an outer side in the vehicle width direction and forming a closed cross section substantially in the vehicle upward/downward direction together with the pillar inner panel,
the side sill includes:
a sill inner panel disposed on an inner side in the vehicle width direction; and
a sill outer panel joined to the sill inner panel on an outer side in the vehicle width direction and forming a closed cross section substantially in the vehicle forward/rearward direction together with the sill inner panel,
a sidewall and a front wall of the pillar outer panel on an inner side in the vehicle width direction extend downward to a position at which the sidewall and the front wall overlap the side sill in an upward/downward direction,
a defective section that forms a non-continuous section with respect to the front wall of the pillar outer panel is provided on a front section of the sidewall of the sill outer panel on an outer side in the vehicle width direction,
a reinforcement plate extending in the vehicle upward/downward direction is coupled to a region in an inner side surface of the pillar outer panel that is a rear section of the closed cross section of the front pillar,
a lower end of the reinforcement plate extends to a position at which the lower end overlaps the defective section in the upward/downward direction on a side behind the defective section, and
a lower edge portion of the sidewall of the pillar outer panel is joined to a sidewall of the sill outer panel on an outer side in the vehicle width direction.

2. The vehicle body side part structure according to claim 1,
wherein the sill outer panel has a bottom wall section configured to cover the front pillar from below at a position at which the defective section is located in the vehicle forward/rearward direction.

3. The vehicle body side part structure according to claim 1, wherein at least a part of the pillar outer panel is formed in a substantially hat-shaped cross-sectional shape having an opening that opens inward in the vehicle width direction and having a front corner section and a rear corner section on an outer side in the vehicle width direction, and at least a part of the reinforcement plate is formed in a substantially L-shaped cross-sectional shape along an inner surface of the rear corner section.

4. The vehicle body side part structure according to claim 1, wherein a closed cross-sectional part extending in the vehicle width direction according to a lower dash and a dash cross member is disposed on the front pillar on an inward side in the vehicle width direction, a bulkhead configured to reinforce the closed cross section is fixed into the closed cross section of the front pillar, the bulkhead has a stepped section in which a bent ridge line extends substantially in the vehicle width direction, and the bent ridge line of the stepped section is substantially linearly aligned with a bent ridge line of the closed cross-sectional part according to the lower dash and the dash cross member.

5. The vehicle body side part structure according to claim 4, wherein the stepped section of the bulkhead is disposed on the side in front of the reinforcement plate.

6. The vehicle body side part structure according to claim 1, wherein the lower edge portion of the pillar outer panel has a sidewall directed outward in the vehicle width direction and a front wall directed in a vehicle frontward direction, the sidewall is coupled to the sidewall of the sill outer panel on an outer side in the vehicle width direction, and the front wall is coupled to an outrigger that connects a front section of the side sill to a rear section of the front side frame.

7. The vehicle body side part structure according to claim 5, wherein a jack-up plate is disposed in a front end region of the side sill, and the jack-up plate comprises:

a main body plate section extending in the closed cross section of the front pillar in a direction substantially perpendicular to the vehicle width direction; and an upper flange bent outward from an upper section of the main body plate section in the vehicle width direction and having an upper surface coupled to a lower surface of a rearward-side region further than the stepped section of the bulkhead.

8. The vehicle body side part structure according to claim 7, wherein the jack-up plate further has a front bent section bent inward from a front end portion of the main body plate section in the vehicle width direction, the main body plate section is sandwiched and fixed between joining sections of the sill inner panel and the sill outer panel, and the front bent section is coupled to an outrigger that connects together the front section of the side sill and the front side frame.

9. The vehicle body side part structure according to claim 1, wherein a second bulkhead configured to reinforce the closed cross section is fixed into the closed cross section of the side sill, and the second bulkhead is disposed in a region of the side sill below the front pillar and at a vehicle rearward position further than a curved section extending downward and rearward.

10. The vehicle body side part structure according to claim 3, wherein the sill outer panel has a sidewall directed outward in the vehicle width direction and an upper wall extending to be bent inward from an upper end portion of the sidewall in the vehicle width direction, a rear lower region of the pillar outer panel extends to be curved toward a vehicle rearward side and the rear corner section is coupled to the sidewall and the upper wall of the sill outer panel, the reinforcement plate includes:

a reinforcement plate main body section directed outward in the vehicle width direction; and a vehicle width extension section extending to be bent inward from a rear section of the reinforcement plate main body section in the vehicle width direction, and a gap is set between a lower end of the vehicle width extension section of the reinforcement plate and the upper wall of the sill outer panel.

11. The vehicle body side part structure according to claim 10, wherein a reinforcement bead extending in the vehicle width direction is provided on the vehicle width extension section of the reinforcement plate.

12. The vehicle body side part structure according to claim 1, wherein an upper region of the reinforcement plate is inclined forward and downward from an upper end toward the front wheel.

13. The vehicle body side part structure according to claim 1, wherein a hinge fixing section configured to fix a door hinge is provided on the reinforcement plate.

* * * * *